United States Patent
Patel et al.

(10) Patent No.: US 8,077,838 B2
(45) Date of Patent: Dec. 13, 2011

(54) METHOD AND VOICE COMMUNICATOR TO PROVIDE A VOICE COMMUNICATION

(75) Inventors: Labhesh Patel, San Francisco, CA (US); Sanjeev Kumar, San Francisco, CA (US); Shmuel Shaffer, Palo Alto, CA (US); Mukul Jain, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1246 days.

(21) Appl. No.: 11/236,903

(22) Filed: Sep. 28, 2005

(65) Prior Publication Data

US 2007/0081639 A1    Apr. 12, 2007

(51) Int. Cl.
*H04M 11/00*    (2006.01)
*H04M 1/64*    (2006.01)

(52) U.S. Cl. ........................... 379/88.13; 379/76
(58) Field of Classification Search .............. 379/88.13
See application file for complete search history.

(56) References Cited

U.S. PATENT DOCUMENTS

| | | | | |
|---|---|---|---|---|
| 5,276,731 | A * | 1/1994 | Arbel et al. | 379/211.02 |
| 5,647,002 | A * | 7/1997 | Brunson | 709/206 |
| 5,742,905 | A * | 4/1998 | Pepe et al. | 455/461 |
| 5,946,386 | A * | 8/1999 | Rogers et al. | 379/265.09 |
| 6,018,571 | A * | 1/2000 | Langlois et al. | 379/201.04 |
| 6,058,415 | A * | 5/2000 | Polcyn | 709/200 |
| 6,085,231 | A * | 7/2000 | Agraharam et al. | 709/206 |
| 6,104,789 | A * | 8/2000 | Lund | 379/93.23 |
| 6,138,036 | A * | 10/2000 | O'Cinneide | 455/557 |
| 6,203,192 | B1 * | 3/2001 | Fortman | 379/88.14 |
| 6,212,550 | B1 * | 4/2001 | Segur | 709/206 |
| 6,222,909 | B1 * | 4/2001 | Qua et al. | 379/88.22 |
| 6,246,871 | B1 * | 6/2001 | Ala-Laurila | 455/413 |
| 6,404,860 | B1 * | 6/2002 | Casellini | 379/88.17 |
| 6,477,240 | B1 * | 11/2002 | Lim et al. | 379/67.1 |
| 6,606,611 | B1 * | 8/2003 | Khan | 706/10 |

(Continued)

FOREIGN PATENT DOCUMENTS

EP    1313298 A1    5/2003

(Continued)

OTHER PUBLICATIONS

"International Application Serail No. PCT/US06/33707, International Search Report Sep. 25, 2007", 3 pgs.

(Continued)

*Primary Examiner* — Joseph T Phan
(74) *Attorney, Agent, or Firm* — Schwegman, Lundberg & Woessner, P.A.

(57) ABSTRACT

A method and voice communicator to provide a voice communication is described. The method may include identifying text to be communicated and automatically processing the text to generate an audio equivalent of the text. For example, the text may be scraped from a web page. The method may include identifying an intended recipient of the audio equivalent and thereafter communicating the audio equivalent as a telephone communication (e.g., a voice mail message in a voice mailbox). Thus, identifying the intended recipient may include requesting a telephone number of a sender (caller) of the voice communication. In an embodiment, the method comprises monitoring selection by a user of a contact list available on the voice communicator wherein the contact list includes a plurality of recipient names and their associated telephone numbers. The audio equivalent is communicated to the recipient device over, for example, PSTN or VoIP network.

24 Claims, 7 Drawing Sheets

U.S. PATENT DOCUMENTS

| | | |
|---|---|---|
| 6,701,162 B1 | 3/2004 | Everett |
| 6,981,223 B2 * | 12/2005 | Becker et al. ............... 715/753 |
| 7,035,923 B1 * | 4/2006 | Yoakum et al. ............. 709/224 |
| 7,194,411 B2 * | 3/2007 | Slotznick et al. ............ 704/271 |
| 7,483,525 B2 * | 1/2009 | Chaddha et al. ........ 379/142.07 |
| 2002/0069062 A1 | 6/2002 | Hyde-Thomson et al. |
| 2002/0078150 A1 * | 6/2002 | Thompson et al. ........... 709/204 |
| 2002/0178007 A1 * | 11/2002 | Slotznick et al. ........ 704/270.1 |
| 2002/0191757 A1 * | 12/2002 | Belrose ..................... 379/88.13 |
| 2003/0068029 A1 * | 4/2003 | McFarland ............... 379/202.01 |
| 2003/0088421 A1 | 5/2003 | Maes et al. |
| 2003/0095642 A1 * | 5/2003 | Cloutier et al. ........... 379/88.13 |
| 2004/0006471 A1 | 1/2004 | Chiu |
| 2004/0176114 A1 * | 9/2004 | Northcutt ..................... 455/466 |
| 2004/0267531 A1 | 12/2004 | Whynot et al. |
| 2005/0060638 A1 | 3/2005 | Mathew et al. |
| 2005/0080643 A1 * | 4/2005 | McLennan et al. ............... 705/1 |
| 2006/0031364 A1 * | 2/2006 | Hamilton et al. ............ 709/206 |

FOREIGN PATENT DOCUMENTS

| | | |
|---|---|---|
| WO | WO-2007037891 A2 | 4/2007 |
| WO | WO-2007037891 A3 | 4/2007 |

OTHER PUBLICATIONS

"International Application Serail No. PCT/US06/33707, Written Opinion Sep. 25, 2007", 8 pgs.

Chinese Application Serial No. 200680030002.9, Office Action mailed Apr. 7, 2010, 15 pgs.

Chinese Application Serial No. 200680030002.9, Office Action Response Filed Aug. 23, 2010, 4 pgs.

European Application Serial No. 06790065.4, Extended European Search Report mailed Jul. 29, 2010, 7 pgs.

Chinese Application No. 200680030002.9—Office Action Response filed Feb. 9, 2011, 18 pgs.

Chinese Application No. 200680030002.9, Office Action mailed Nov. 23, 2010, 15 pgs.

European Application No. 06790065.4, Extended EP Search Report Response, 19 pgs.

* cited by examiner

METHOD AND VOICE COMMUNICATOR TO PROVIDE A VOICE COMMUNICATION

TECHNICAL FIELD

This application relates to a method and voice communicator (e.g., a telephone) to provide a voice communication in a telephone communication network.

BACKGROUND

Telephone communication networks that allow voice/audio communication are well known in the art. Examples of such networks are traditional Public Switched Telephone Networks (PSTNS) and, with the advent of the Internet, Voice over Internet Protocol (VoIP) systems are increasing in popularity. While PSTN calls use a dedicated communication line or circuit for each user to complete a telephone call, VoIP calls are made via the Internet (a shared medium). Both the signaling and the media of VoIP calls use packet transmission over the Internet or over a local network (LAN). However, VoIP systems use hardware and software that enables people to use the Internet as the transmission medium for telephone calls by sending voice data in packets using IP rather than by traditional circuit transmissions of the PSTN. Further, cellular telephone networks are growing at an extremely high rate.

Independent of telephone communication networks that communicate audio, email communication networks communicate text which may be read by a recipient. Although the same physical network may be utilized to communicate both an audio telephonic communication and a textual communication, the actual communications are independent and different.

BRIEF DESCRIPTION OF DRAWINGS

Embodiments of the present invention are illustrated by way of example and not limitation in the figures of the accompanying drawings, in which like references indicate similar elements and in which.

DETAILED DESCRIPTION

In an example embodiment, a method, device and a system to provide a voice communication in a telephone communication network is described. The system and method may provide cross-context or cross-media functionality where text (written media) is converted and communicated to recipient via a voice communication (audible media) as a telephone communication.

In the following detailed description of example embodiments, reference is made to the accompanying drawings which form a part hereof, and in which is shown by way of illustration specific embodiments in which the example method, device and system may be practiced. It is to be understood that other embodiments may be utilized and structural changes may be made without departing from the scope of this description. It is to be appreciated that the term "voice communicator" is intended to include any hardware and software that provide telephone functionality. For example, the voice communicator may be defined by a computer device running telephone software (e.g., an IP Communicator available from Cisco Systems). The computer device may be a multi-function computer device such as personal computer or a dedicated computer device such as a stand-alone IP telephone. The computer device may have a resident Operating System (OS) and an audio driver with the capability of initiating Voice over Internet Protocol (VoIP) or Public Switched Telephone Network (PSTN) calls. The audio driver may be fully integrated within the OS and be capable of providing the functionality of delivering voice messages to targets/recipients. It should also be noted that the voice communicator may or may not provide other functionality in addition to telephone functionality.

For the purposes of this application the term text is intended to include words, sentences, paragraphs or the like that a recipient user may read. An email message may, for example, comprise text. Text may include text stored as ASCII codes (with or without any formatting). The term "audio" or "speech" is intended to include any audible communication that a recipient user may listen to.

The embodiments described herein may be deployed in a PSTN. In addition or instead, the embodiments described herein may be deployed in a VoIP environment using hardware and software that enables people to use the Internet as the transmission medium for telephone calls by sending voice data in packets using IP rather than by traditional circuit transmissions of the PSTN. Likewise, the embodiments described herein may be deployed in a cellular telephone environment.

Figure 1:
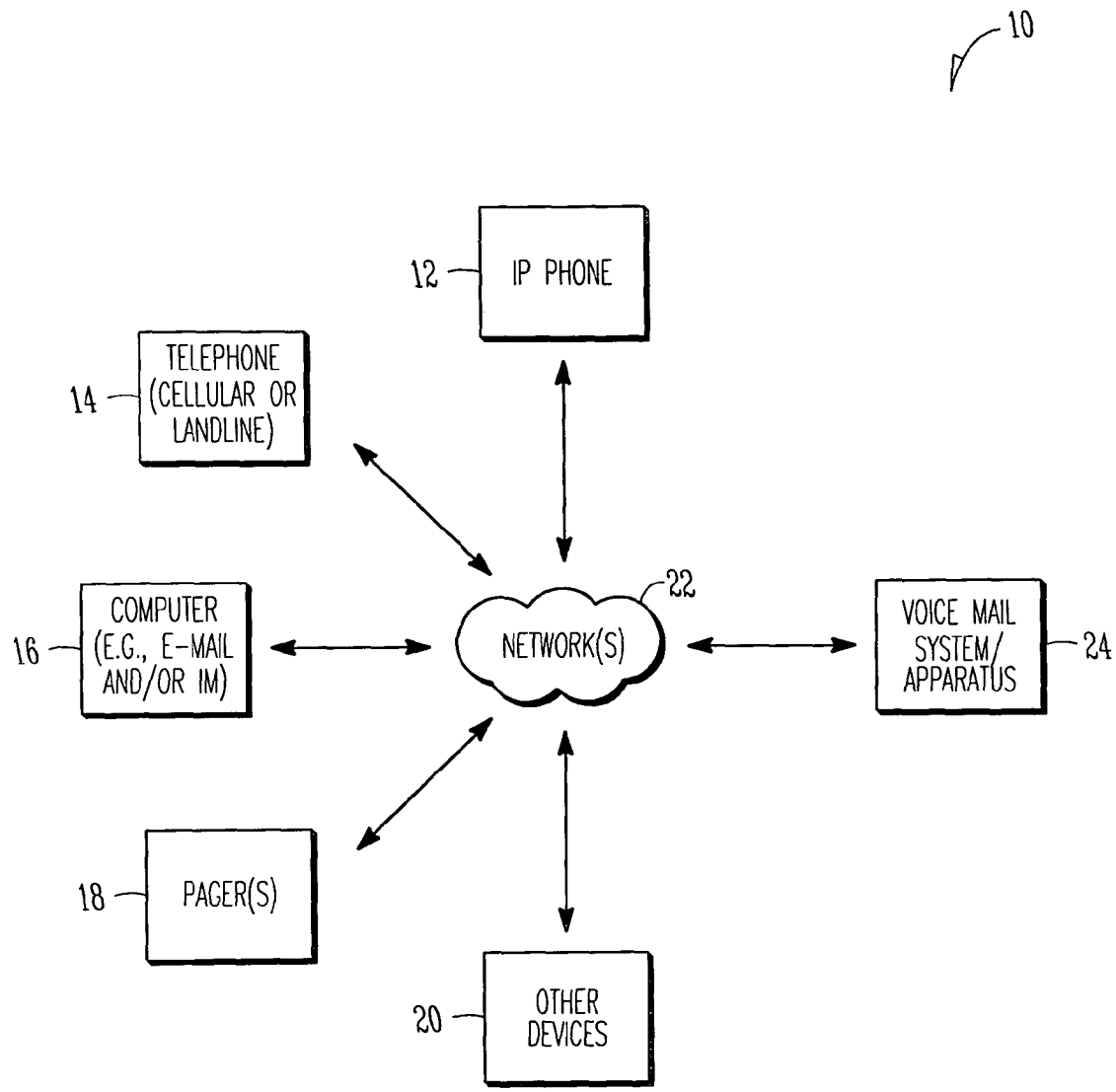
FIG. 1 shows architecture of a system, in accordance with the an example embodiment, to provide a voice communication in a telephone communication network.

FIG. 1 shows architecture of a system 10, in accordance with an example embodiment, to provide a voice communication in a telephone communication network. For example, the system 10 may be used to provide voice mail messages derived from any text (e.g., from an Instant Messages (IM) client, from an email client, from a web browser, or the like). The system 10 thus allows cross-context messaging or communication from a text context (e.g., text in an email client) to an audio context (audio in a telephone client such as a soft phone).

For example, a recipient of the voice communication/telephone call may not have email access (e.g., no email access at all or no email access during a given time period) and the sender may wish to communicate with the recipient via voice in real time or leave a voicemail for the recipient. In certain circumstances, the sender may wish to leave a voice mail for himself. For example, the sender may wish to send driving directions (e.g., from MapQuest, Yahoo, Google or the like) to his voice mailbox so that he can listen to them while driving rather than trying to read maps or driving directions. Further, a sender receiving an email need not be confined to returning the email communication via the same media (textual communication media) but may communicate a response via a different media (audio media).

The system 10 is shown to include a Voice over Internet Protocol (VoIP) phone 12, a telephone 14 (which may be a cellular telephone, a wired or landline telephone, or the like), a computer 16 (e.g. a personal computer including an email and/or Instant Message client), a pager 18, or any other device 20 allowing communication between humans (audio and/or text). The devices 12 to 20 may communicate via one or more networks 22 and any one of the devices 12 to 20 may have a voice mail system or apparatus 24. It will be appreciated that any one or more of the devices 12 to 20 may include, or have access to, a voice mail system/apparatus box 24. It will be appreciated that the system 10 may include a plurality of different devices and that the devices shown in FIG. 1 are merely by way of example.

Figure 2:
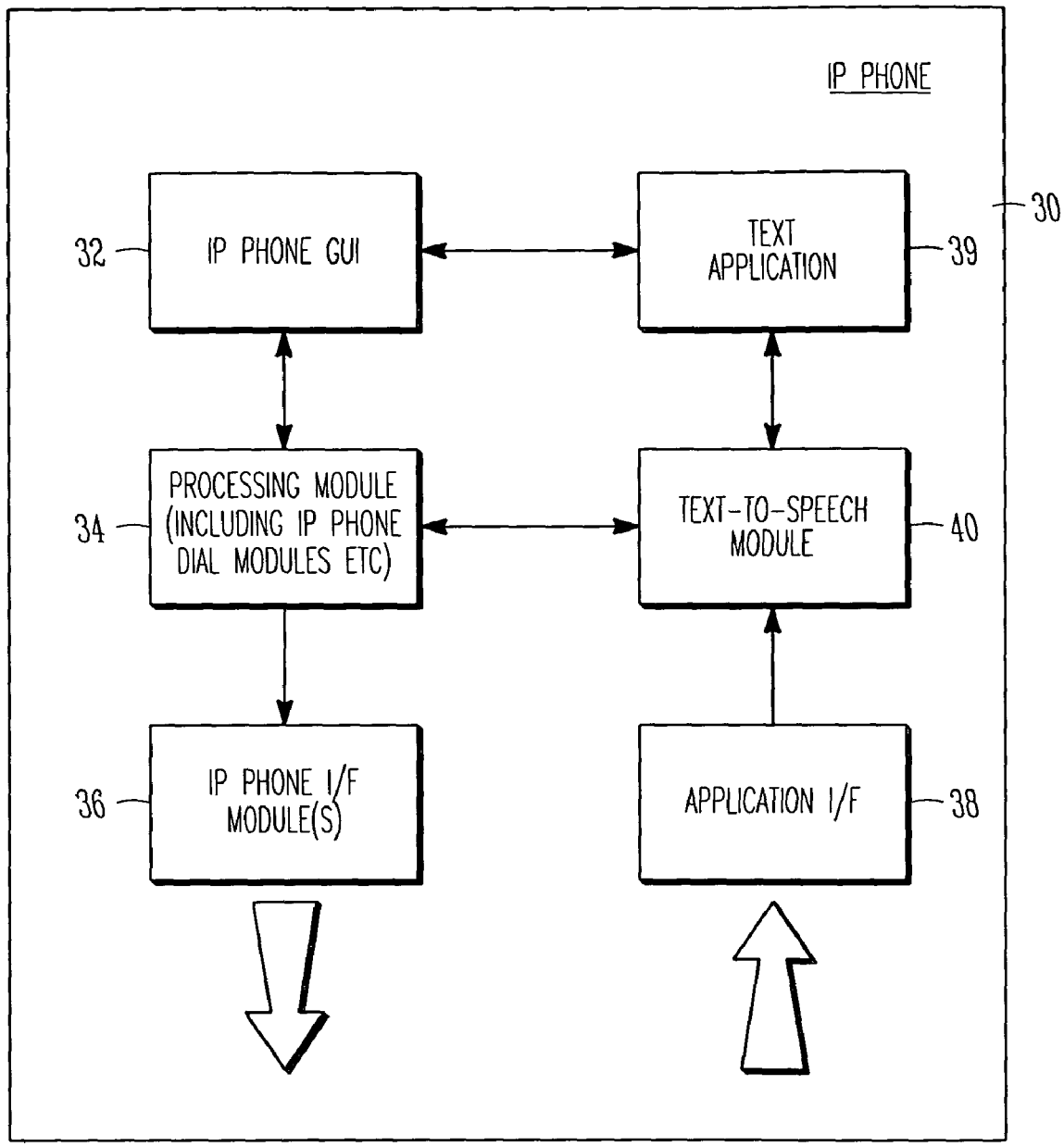
FIG. 2 shows a block diagram of voice communicator, in accordance with an example embodiment, to provide a voice communication in a telephone communication network.

FIG. 2 shows a block diagram of voice communicator 30, in accordance with an example embodiment, to provide a voice communication in a telephone communication network. The voice communicator 30, in an example embodiment, may be deployed in the system 10. For example, the voice communicator 30 may be integrated within any one or more of the devices 12 to 20, or form an independent device connected to the network 22. The voice communicator 30 is described, by way of example, with reference to an IP phone or soft phone (e.g., an application running on a computer device perform so that the device operates as a telephone) but it will be appreciated to one skilled in the art that the voice communicator 30 may be deployed in any telephone device both wired and/or wireless. In the soft phone embodiment, Internet-based voice communication may be utilized and, instead of calls that were once required to be managed by the public switched telephone network (PSTN) that assigns a dedicated communication line or circuit for each user to complete a telephone call, calls are made via the Internet (a shared medium) by breaking the voice data into varying sized packages or "packets," and transmitting them over the Internet. An example of a soft phone wherein the voice communicator, or components thereof, may be deployed is an IP Communicator available from Cisco Systems.

The voice communicator 30 is shown to include an IP phone graphical user interface (GUI) 32, a processing module 34, an IP phone interface module 36, an application interface 38, and a Text-To-Speech module 40. In an embodiment, the voice communicator 30 includes all the conventional functionality provided by a telephone such as allowing a caller (sender) to make telephone calls to a callee (called party or recipient). However, unlike conventional telephone devices, the voice communicator 30 with its application interface 38 may interface directly with any text application (e.g. a web browser that may display text, a word processing application such as Microsoft Word that displays text or the like). The Text-To-Speech module 40 may be any application that automatically processes text to generate an audio equivalent of the text which, as described in more detail below, is processed and converted to an audio or telephony communication. In an embodiment, the Text-To-Speech functionality is integrated with and performed by the processing module 34. The voice communicator 30 may optionally include a text application 39 forming a fully integrated multi-context (text and audio) communication device/application. In this embodiment, the application interface 38 may or may not be included in the voice communicator 30.

Figure 3:
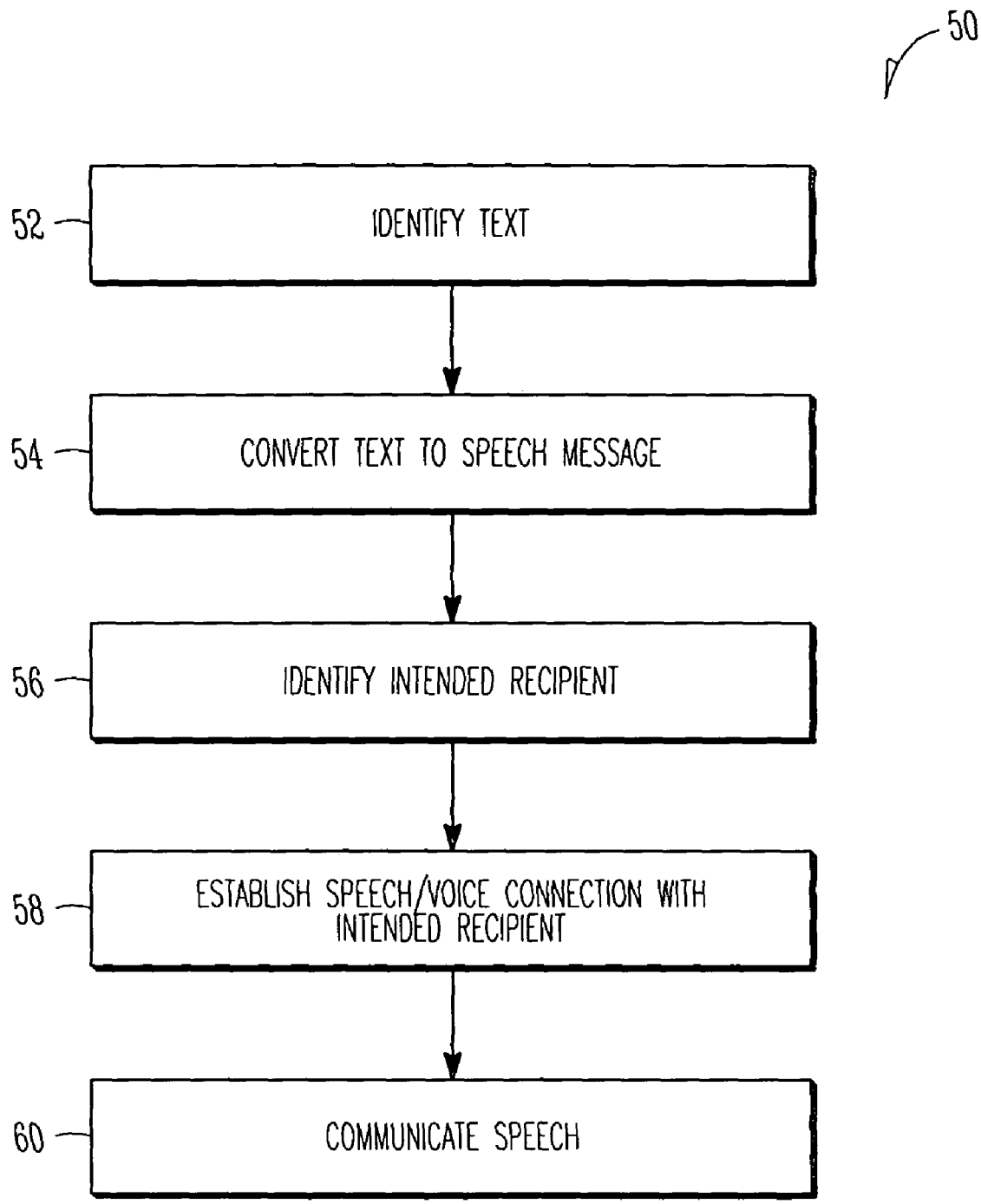
FIG. 3 shows a flow diagram of a method, in accordance with an example embodiment, to provide a voice communication in a telephone communication network.

Referring in particular to FIG. 3, reference 50 generally indicates a method, in accordance with an example embodiment, to provide a voice communication in a telephone communication network. The method 50 may be performed by the voice communicator 30 and, accordingly, the method 50 is described with reference thereto. As shown at block 52, a user may identify text being displayed on a display screen (e.g. a display screen of a computer system, a display screen of a cellular telephone, a display screen of a personal digital assistant (PDA), and so on). The identified text may then be communicated to the Text-To-Speech module 40 via the application interface 38. Thereafter, as shown at block 54, the identified text is converted to a speech message by the Text-To-Speech module 40 and communicated to the processing module 34. The processing module 34 may include conventional IP phone functionality such as a dial module and the like.

Once the identified text has been converted to speech, the voice communicator 30 then identifies a telephone number (or IP address) of an intended recipient (see block 56 in FIG. 3). Once the telephone number (or IP address) of the intended recipient has been identified, the processing module 34 in combination with the IP phone interface module 36 establishes a speech/voice connection with the intended recipient (see block 58). Thereafter, the equivalent audio which has been converted from the identified or selected text is communicated by the voice communicator 30. Thus, the method 50 allows a sender to communicate data selected from one context (a text context) via a different context (a voice context) to a recipient.

In an example embodiment, the voice and text functionality is fully integrated in to a single multi-context application and are thus not provided in separate applications. For example, a driver of the Operating System (OS) may provide functionality utilized by a phone but the functionality may also be utilized by other applications and the functionality need not be exclusive to a phone. For example, the functionality may be provided by an OS utility which is available to all text applications (or any other applications) available on the device. As a result, any application can, for example, use the right click paradigm and invoke the services of this example driver to translate text into voice or audio and send the audio equivalent to a desired destination (or recipient) either via a phone call (which may be done automatically by the driver and not by the person) or, alternatively, via a voice message sent directly to a voicemail messaging system of the recipient (e.g., using AMIS or X.400 standards).

Figure 4:
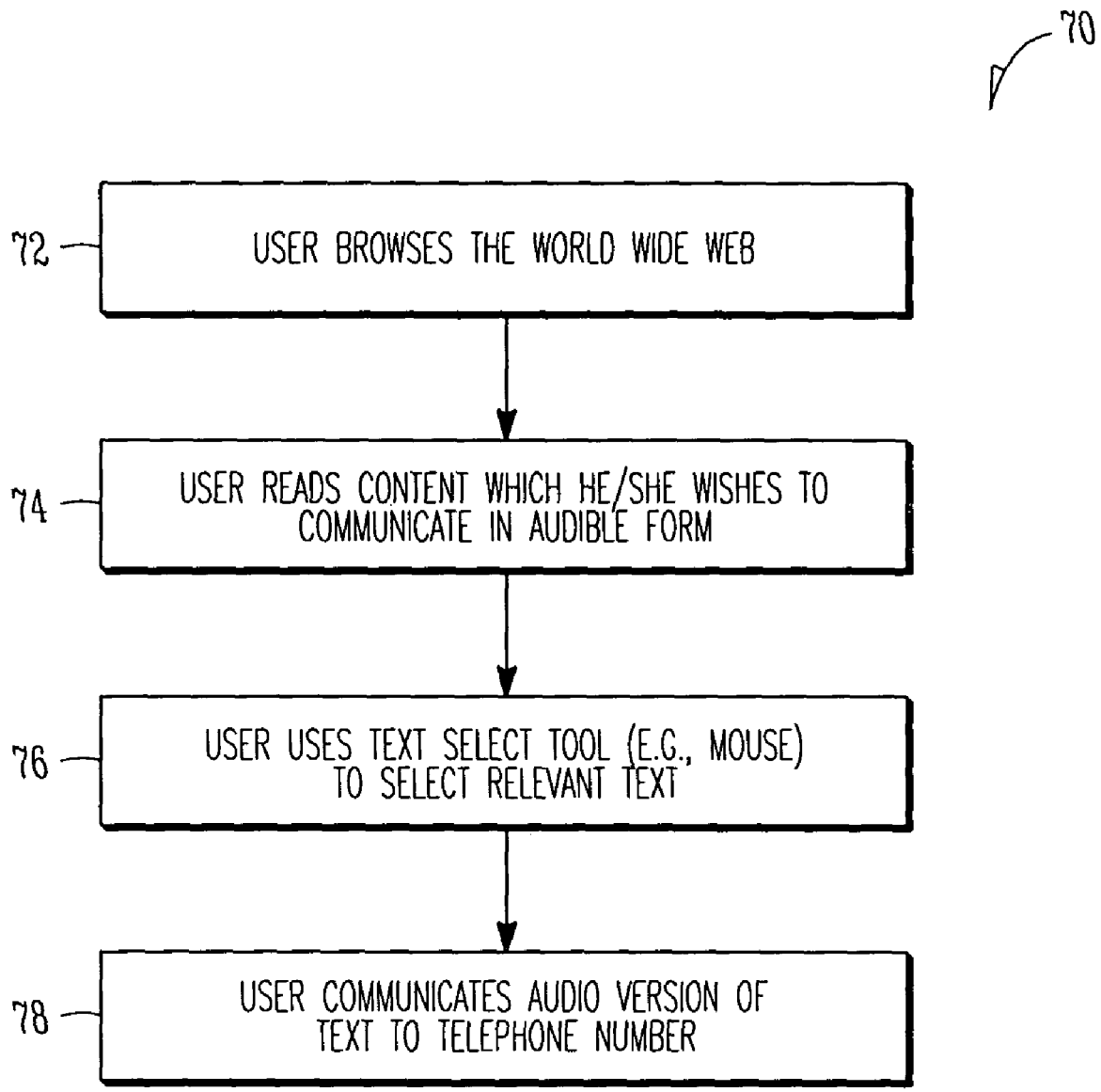
FIG. 4 shows a flow diagram of the method of FIG. 3 deployed in an example web environment.

FIG. 4 shows a flow diagram of a method 70, in accordance with an example embodiment. The method 70 corresponds to the method 50 (see FIG. 3) in that it is a deployment of the method 50 in an example World Wide Web (WWW) environment. For example, a user may browse the web and come across an article which he or she wishes to communicate to a friend. In other circumstances, the user may be accessing the web to obtain driving directions to a particular geographical location (see block 72). Thus, the user may read the content which he or she wishes to communicate in an audible form (see block 74) and then use a text select tool (e.g. a mouse, a pointer in conjunction with a touch screen, keys of a keyboard, or the like) to select or identify relevant text for communication in an audible form (see block 76). Thereafter, using conventional operating system commands, the user may import the text into a soft phone or any telephone communication device which then communicates the audio equivalent of the text to a telephone number (or IP address) (see block 78). It will be appreciated that entire files may be imported into the soft phone for communication in an audible form and that the embodiments are not restricted merely to portions of text shown in documents.

Figure 5:
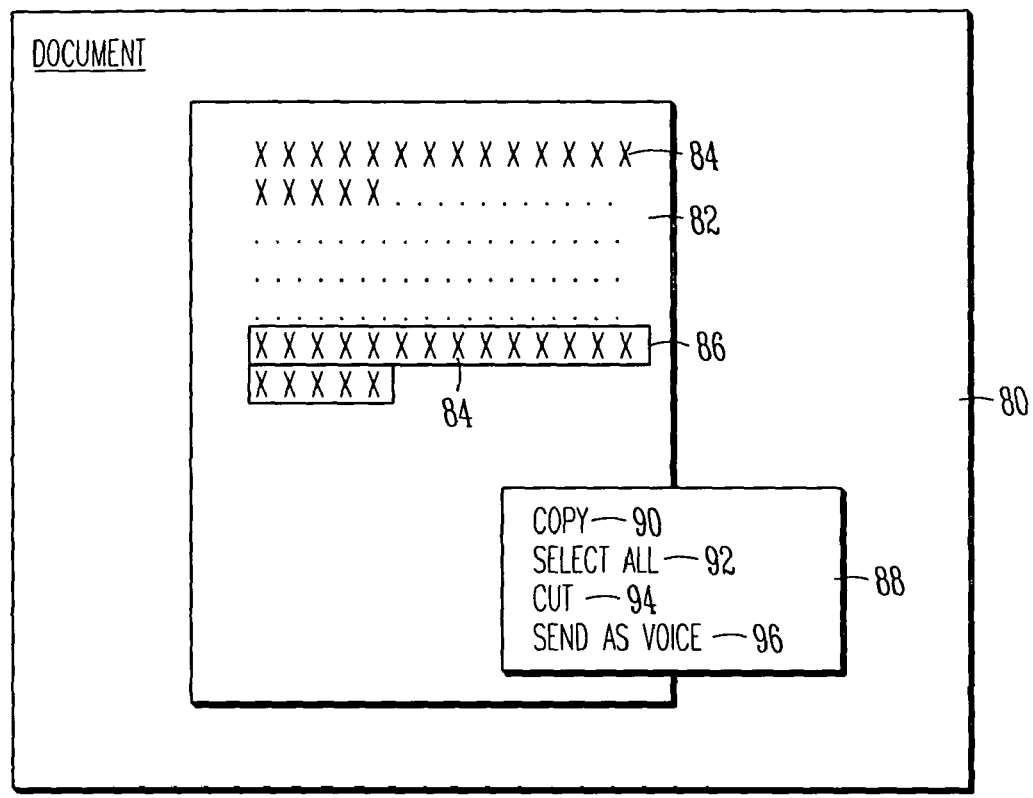
FIG. 5 shows a graphical user interface, in accordance with an example embodiment, to identify text for communication as audio via a telephone communication network.

FIG. 5 shows a graphical user interface (GUI) 80 which, for example, may be a display screen generated by Microsoft Word, a web browser, or any other display rendering application. In the example GUI 80, a document or page 82 is shown to include text 84 which is readable by a user. The user may then highlight a portion of text 86 which he or she wishes to communicate and, for example, may right click on the highlighted portion of text 86 whereupon a popup menu 88 is generated. The popup menu 88 may include conventional commands such as 'Copy' 90, 'Select All' 92, "Cut" 94, and the like. However, in addition to the conventional commands 90 to 94, the popup menu 88 includes a 'Send As Voice' command 96. The user may then select the 'Send As Voice' command 96 (e.g. using keys of a keyboard, a pointing device such as a mouse, or the like) whereupon the method 50 may generate a telephone number identification popup to allow the sender to enter or identify a telephone number of the intended recipient.

Figure 6:
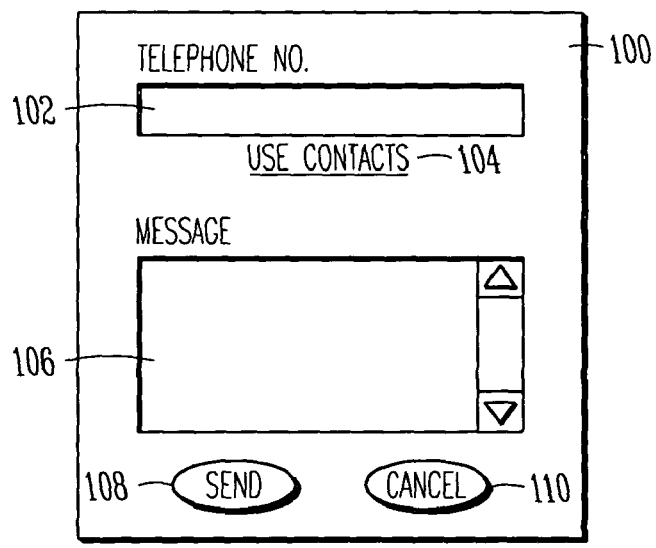
FIG. 6 shows a graphical user interface, in accordance with an example embodiment, to identify a recipient telephone number.

FIG. 6 shows a graphical user interface (GUI) 100, in accordance with an example embodiment, to identify a recipient telephone number. The GUI 100 is shown to include a telephone number field 102 in which the sender may enter an intended recipient's telephone number. However, in addition or instead, the GUI 100 provides a contacts link 104 which, upon selection by a user, may open a contacts list or address book (e.g. an Microsoft Outlook contacts list or address book including a plurality of potential recipients of the voice communication). The user may then identify one or more of the contacts in the contacts or address book as the intended recipient. Upon selection of one or more recipients, their associated telephone numbers may be automatically imported into the telephone number field 102.

The GUI 100 optionally includes a message field 106 wherein the sender (caller) may type or enter a textual message to the intended recipient (callee or called party) or recipients. The text or message entered by the user is then also converted into an audio message equivalent (e.g. using the Text-To-Speech module 40) and is communicated together with the audio equivalent of the text that has been identified (e.g. the highlighted portion of text 86 in FIG. 5). The audio message equivalent may be communicated prior to the audio equivalent of the selected text so that it may act as an introduction to the audio equivalent that follows. For example, the equivalent audio message may thus be similar to a fax coversheet that describes the contents of the text that follows in the fax. However, in the example embodiment, the audio message equivalent is in an audio context as opposed to a textual context of a fax. Once the sender is satisfied with the contents of the message and has identified the telephone number of the intended recipient, he or she may activate a 'Send' button 108 in order to send the message to the intended recipient via a telephone communication system as a telephone call. If, however, the sender wishes to cancel the operation, a 'Cancel' button 110 may be activated.

In the example GUI 80, the sender may use conventional 'cut and paste' functionality provided by most computer operating systems. Thus, the user. may select text, cut the text from the text document in which it exists, and past the text into a soft phone which then, in an automated fashion and without human intervention, converts the selected text into an audio equivalent. The audio equivalent is then communicated as a voice call via the soft phone to an intended recipient.

It will be appreciated that the audio or voice equivalent may be communicated to a voice mailbox (e.g., the voice mail system/apparatus 24 shown in FIG. 1) of the intended recipient or be communicated to the intended recipient in real time (e.g., a regular voice conversation). For example, if the intended recipient does not answer his or her telephone, then the audio equivalent may be communicated to the intended recipient's voice mailbox. If, however, the intended recipient answers his or her telephone, then the audio equivalent may be communicated in real time to the intended recipient. In an example embodiment, the voice communicator 30 and the method 50 may also, in addition to the audio communication via a telephone network, communicate the selected text (or a selected document) via an email communication. Thus, the intended recipient may receive the communication via two different media (an audio media and a text media). In an example embodiment, if the recipient deletes the audio communication from a voice mailbox, then the email communication in an email mailbox may also be automatically deleted. Likewise, if the recipient deletes the email communication from an email mailbox, the audio equivalent may also then automatically be deleted from a corresponding voice mailbox.

Figure 7:
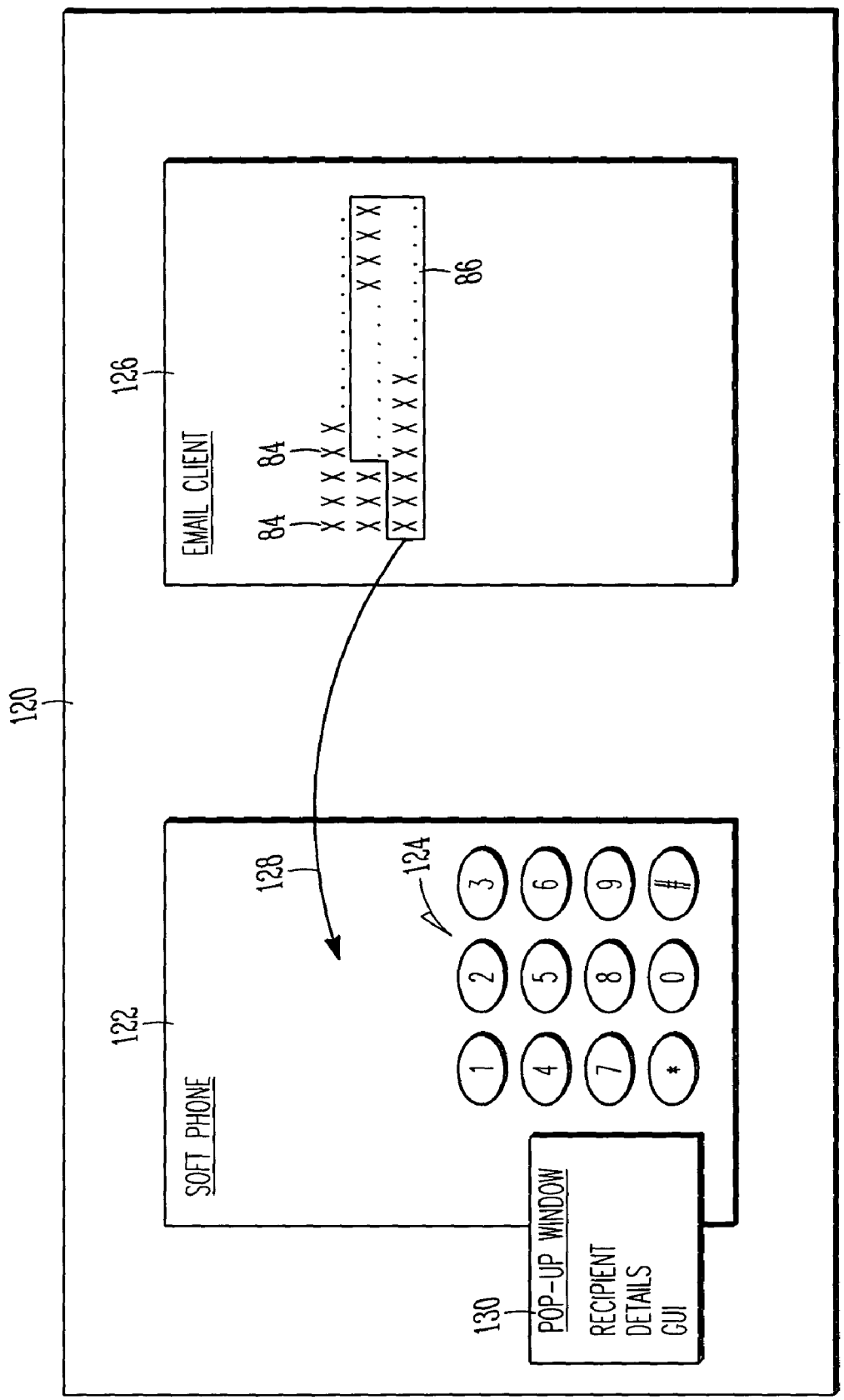
FIG. 7 shows a display screen providing a graphical user interface, in accordance with an example embodiment, for importing text into a soft phone.

FIG. 7 shows a display screen providing a graphical user interface (GUI) 120, in accordance with an example embodiment, for importing text into a soft phone (e.g. an IP communicator available from Cisco Systems). The GUI 120 may be provided on a display screen of any electronic device such as, for example, a computer (portable or otherwise) on which the soft phone is resident. The soft phone is shown to have an independent GUI 122 which allows a user to make conventional telephone calls via the computer and, accordingly, includes soft keys 124 that enable the user to dial a telephone number of a telephone (soft phone or any other telephone) of a recipient. However, as described in more detail below, the soft phone may include novel functionality which allows a person making a telephone call to automatically, and without human intervention, convert text to an audio equivalent and communicate the audio equivalent to a recipient via his or her telephone.

The display screen 120 is shown to display text 86, for example, via an email client graphical user interface (GUI) 126. In use, a user may highlight a selected portion of text 86 and, as shown by arrow 128, import the selected portion of text 86 into the soft phone via its graphical user interface 122. For example, the user may, as hereinbefore described, 'cut and paste' the selected portion of text 86 into the soft phone's graphical user interface 122, 'drag and drop' the selected portion of text 86 into the soft phone's graphical user interface 122, or the like. In an embodiment, when the user has imported the selected text 86 into the soft phone, a popup window 130 is automatically generated to allow the sender to identify details of the recipient. In an embodiment, the popup window 130 may resemble the GUI 100 (see FIG. 6). The audio equivalent may then be communicated via a telephone call to the intended recipient.

It will be appreciated that, in the example embodiments, conversion of text to an audio equivalent is performed at a client device (e.g. at a client telephone, a client computer (personal computer, laptop computer, handheld computer, or the like)) which may, or may not, communicate with a server arrangement. Thus, in an example embodiment, the conversion from text to an audio equivalent does not take place at a server side. Accordingly, a subscriber telephone including any one or more of the embodiments described herein, may perform the functionality at a sender side and the audio equivalent may then be communicated via any telephone system including a traditional hardwired PSTN telephone system. In an embodiment, the audio equivalent of the text may be in a .wav format, an MP3 format, or any other audio format. Further, it will be appreciated that the embodiments described herein may function as standalone units or be fully integrated within an existing telephone (e.g. an existing IP telephone which may be a dedicated IP telephone or a multi-function device such as personal computer, laptop computer, PDA, smart phone, or the like). Further, it will be appreciated that the identified or selected text may be sourced from any client application that displays text including an instant messaging (IM) client, any web application, and any word processing or document presentation application (e.g. Microsoft Word, Microsoft PowerPoint, or the like).

When a sender desires to communicate both the selected text (or an entire file) and its audio equivalent, a check box may be provided in a graphical user interface which, when checked by the sender, results in both the selected text (or an entire file) and its audio equivalent being sent to one or more intended recipients. In an example embodiment, the sender may receive an email wherein the sender of the email has indicated his or her preference in which to receive a response. For example, an email may be received in which the email sender indicates that he or she would appreciate receiving a response in an audio context and/or an email context. Accordingly, a user of the method 50 or the voice communicator 30 may return a communication in a different context (e.g. receive a communication in a text context and respond in a voice context).

In an example embodiment, a user may address an e-mail by adding one or more user identifications (user IDs) of one or more target recipients. If the user wants to send the e-mail as a voice message, all that the user needs to do is to place a phone number in the list of the recipients. As a result, the system 10 understands that recipient is reachable via telephone, may automatically translate the media from text to voice and automatically dial the telephone number of the intended recipient(s) to deliver the voice message. In an embodiment, an e-mail client invokes the underlying services of the OS which are similar in function to the one provided by phone devices today. Thus, it will be appreciated that the methods 50 and 70 may be integrated within an email client on a computer.

In yet another related embodiment, the e-mail client may have a dedicated place or field for entering the "voice recipients". For example an e-mail icon next to the "To" means that the relevant individuals will receive a text e-mail while one or more users whose IP address is entered in the "To" entry next to a phone icon will get the message via an audio message. It will be appreciated that the user need not have to enter any phone numbers in this field but need only identify an intended recipient (e.g., using the intended recipient's first and/or last name, user ID, or the like). The system may use a global directory to find the best mode of delivering the audio message to the target user.

Figure 8:
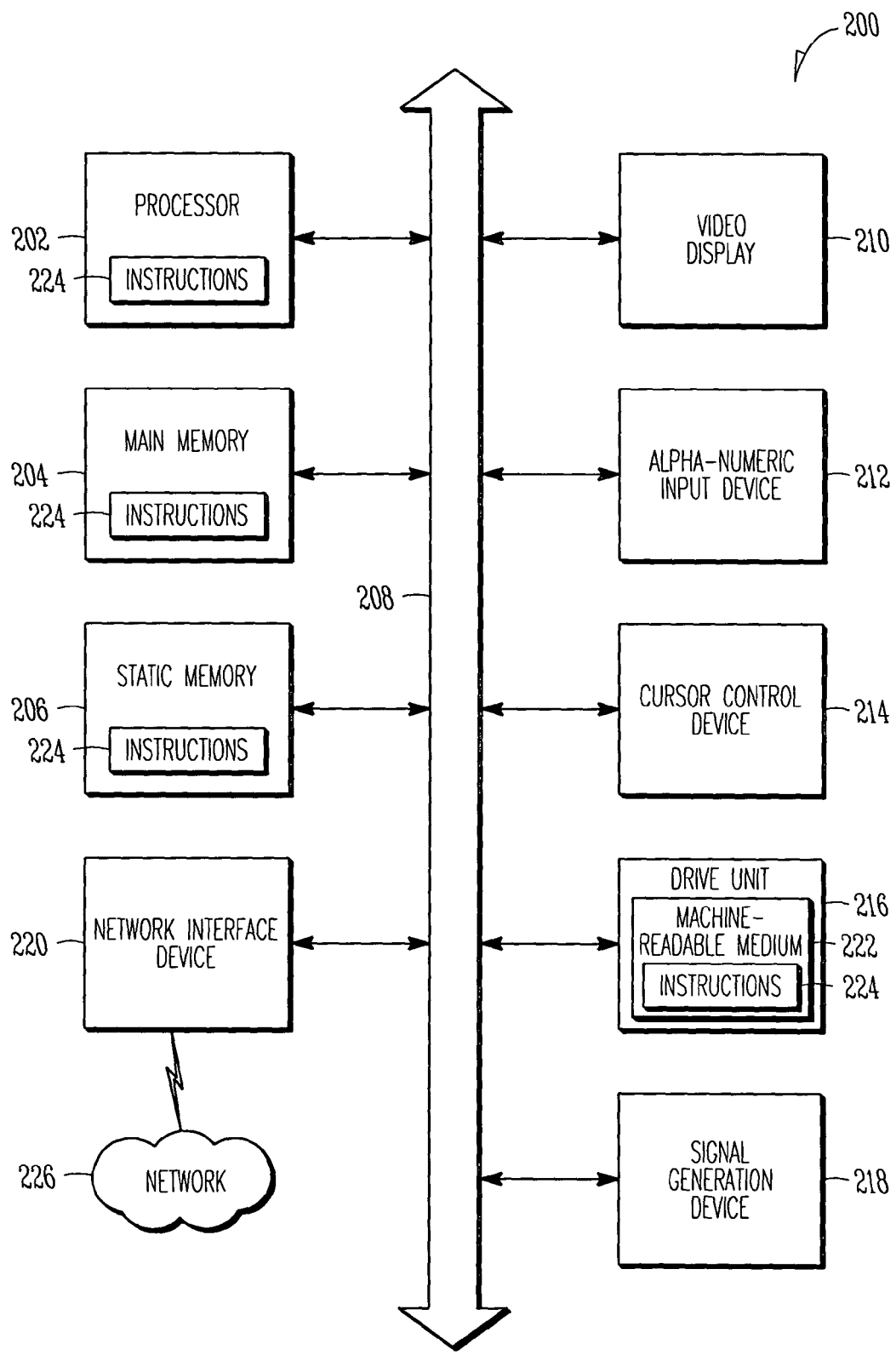
FIG. 8 shows a block diagram of a machine including instructions to perform any one or more of the methodologies described herein.

FIG. 8 shows a diagrammatic representation of machine in the example form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a voice mail system, a cellular telephone, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU), a graphics processing unit (GPU), Digital Signal Processor (DSP), or any combination of these processors), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), optionally a user interface (UI) navigation device 214 (e.g., a mouse), optionally a disk drive unit 216, a signal generation device 218 (e.g., a speaker) and a network interface device 220.

The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilizing any one of a number of well-known transfer protocols (e.g., HTTP).

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAM), read only memory (ROMs), and the like.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method of providing a voice communication, the method comprising:
    at a voice communicator, identifying text to be communicated by selecting relevant text for communication in an audible form;

automatically processing the text to generate an audio equivalent of the relevant text, wherein the processing is by a multi-context application having voice and text functionalities;

enabling a user selection of an intended recipient of the audio equivalent of the relevant text by requesting a telephone number of the intended recipient from the user using the voice communicator, the requesting comprising:

monitoring a selection by the user of a contact list available on the voice communicator, the contact list including recipient names and their associated telephone numbers, monitoring a selection of at least one recipient name from the recipient names, and identifying the telephone number of the at least one recipient name from the selection;

establishing a telephone connection with a recipient device using the telephone number of the at least one recipient name; and communicating the audio equivalent as a telephone communication to the recipient device of the intended recipient, the recipient device being a voice mailbox.

2. The method of claim 1, wherein the telephone communication is a voice communication via one of a Public Switched Telephone Network (PSTN) and a Voice over Internet Protocol (VoIP) environment and the voice communicator is a telephone.

3. The method of claim 1, wherein automatically processing comprises providing the text to a Text-To-Speech engine executing on the voice communicator.

4. The method of claim 1, wherein communicating the audio equivalent as a telephone communication comprises communicating the audio equivalent to a software telephone application, the software telephone application communicating the audio equivalent using VoIP.

5. The method of claim 4, which includes automatically importing the text into the software telephone application from a text rendering application.

6. The method of claim 1, which comprises communicating identified text between a software telephone application and a text rendering application.

7. The method of claim 6, wherein the software telephone application and the text rendering application are integrated within the voice communicator.

8. The method of claim 6, wherein the text rendering application is selected from the group consisting of web browser, an email client, and a document editing application.

9. The method of claim 6, which comprises:
identifying at least a portion of text highlighted by a user in the text rendering application; and
allowing a user to drag and drop the highlighted text into the software telephone application thereby to import the text.

10. The method of claim 6, which comprises:
identifying at least a portion of text highlighted by a user in the text rendering application; and
allowing a user to cut and paste the highlighted text into the software telephone application thereby to import the text.

11. The method of claim 1, which comprises:
providing a sender with a message interface to enter a textual message;
converting the textual message to an equivalent audio message; and
communicating the equivalent audio message together with the audio equivalent of the text to the recipient, the equivalent audio message to be communicated to a recipient prior to the audio equivalent of the text.

12. The method of claim 1, wherein the voice communicator forms part of a text rendering application.

13. The method of claim 12, wherein the text rendering client delivers the audio equivalent directly to a messaging system of the recipient, 14. The method of claim 13, wherein the text rendering client delivers the audio equivalent of the relevant text via a messaging system supporting AMIS or X.400 standards.

15. The method of claim 1, wherein voice communicator comprises an audio driver capable to initiate VoIP or PSTN calls, the audio driver being fully integrated within an Operating System (OS) of a computer device.

16. A non-transitory tangible medium capable of storing a set of instructions which, when executed by a machine, cause the machine to:

identify text to be communicated at a voice communicator by selecting relevant text for communication in an audible form;

automatically process the relevant text to generate an audio equivalent of the relevant text, wherein the processing is by a multi-context application having voice and text functionalities;

enable a user selection of an intended recipient of the audio equivalent by requesting a telephone number of the intended recipient from the user using the voice communicator, the requesting comprising:

monitoring a selection by the user of a contact list available on the voice communicator, the contact list including recipient names and their associated telephone numbers, monitoring a selection of at least one recipient name from the recipient names, and identifying the telephone number of the at least one recipient name from the selection;

establish a telephone connection with a recipient device using the telephone number of the at least one recipient name; and communicate the audio equivalent as a telephone communication to the recipient device, the recipient device being a voice mailbox of the intended recipient.

17. A voice communicator comprising:

an application interface configured to identify text to be communicated by selecting relevant text for communication in an audible form;

a processing module configured to automatically process the text to generate an audio equivalent of the relevant text, wherein the processing is by a multi-context application having voice and text functionalities;

the application interface further configured to enable a user selection of an intended recipient of the audio equivalent of the relevant text by requesting a telephone number of the intended recipient from the user using the voice communicator the requesting compromising:

monitoring a selection by the user of a contact list available on the voice communicator, the contact list including recipient names and their associated telephone numbers, monitoring a selection of at least one recipient name from the recipient names, and identifying the telephone number of the at least one recipient name from the selection; and an interface module configured to establish a telephone connection with a recipient device using the telephone number of the at least one recipient name, and to communicate the audio equivalent as a telephone communication to the recipient device of the intended recipient, the recipient device being a voice mailbox.

18. The voice communicator of claim 17, wherein the telephone communication is via one of a Public Switched Telephone Network and a Voice over Internet Protocol (VoIP) environment.

19. The voice communicator of claim 17, wherein the voice communicator comprises a software telephone application and the communication module is a VoIP communication module.

20. The voice communicator of claim 19, which comprises automatically communicating the text into the software telephone application from a text rendering application.

21. The voice communicator of claim 20, wherein the software telephone application and text rendering application are integrated within the voice communicator.

22. The voice communicator of claim 19, wherein the processing module:
   identifies text highlighted in the text rendering application by a user; and
   facilitates a user to drag and drop the highlighted text into the software telephone application thereby to import the text.

23. The voice communicator of claim 19, wherein the processing module:
   identifies text highlighted in the text rendering application by a user; and
   allows a user to cut and paste the highlighted text into the software telephone application thereby to import the text.

24. The voice communicator of claim 17, which comprises a graphical user interface to provide a sender with a message interface to enter a textual message, the processor being to convert the textual message to an equivalent audio message, and the communication module being to communicate the audio message together with the audio equivalent, the equivalent audio message to be communicated to a recipient prior to the audio equivalent.

* * * * *

UNITED STATES PATENT AND TRADEMARK OFFICE
CERTIFICATE OF CORRECTION

| | | |
|---|---|---|
| PATENT NO. | : 8,077,838 B2 | Page 1 of 1 |
| APPLICATION NO. | : 11/236903 | |
| DATED | : December 13, 2011 | |
| INVENTOR(S) | : Labhesh Patel et al. | |

It is certified that error appears in the above-identified patent and that said Letters Patent is hereby corrected as shown below:

In column 10, line 7, in Claim 13, delete "recipient," and insert -- recipient. --, therefor.

In column 10, line 55, in Claim 17, delete "communicator" and insert -- communicator, --, therefor.

Signed and Sealed this
Twenty-eighth Day of February, 2012

David J. Kappos
*Director of the United States Patent and Trademark Office*